June 16, 1953  S. B. LIPPINCOTT  2,642,453
PREPARATION OF BORATES OF TERTIARY ALCOHOLS
Filed Sept. 26, 1947
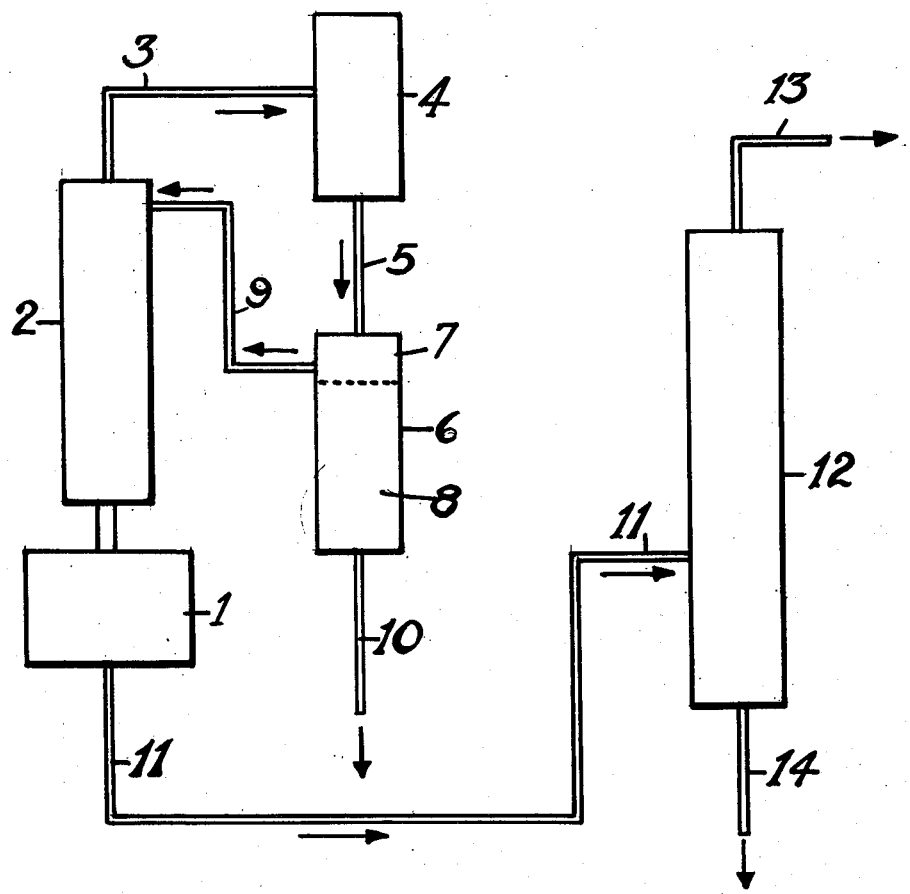
Samuel B. Lippincott Inventor
By Henry Berk Attorney Patented June 16, 1953

2,642,453

UNITED STATES PATENT OFFICE 2,642,453

PREPARATION OF BORATES OF TERTIARY ALCOHOLS

Samuel B. Lippincott, Westfield, N. J., assignor to Standard Oil Development Company, a corporation of Delaware Application September 26, 1947, Serial No. 776,199

8 Claims. (Cl. 260—462)

This invention relates to new compositions of matter comprising neutral borates of aliphatic tertiary alcohols, neutral borates of cyclic tertiary alcohols and neutral borates of aralkyl tertiary alcohols. The invention is also concerned with a new and improved process for preparing neutral borates of aliphatic tertiary alcohols, neutral borates of cyclic tertiary alcohols and neutral borates of aralkyl tertiary alcohols by direct esterification of a tertiary alcohol with boric acid.

Bannister, U. S. 1,668,797, has described a method of direct esterification of normal butyl alcohol with boric acid to form normal butyl borate, whereby the boric acid is reacted with a molecular excess of normal butyl alcohol and the mixture distilled until the water of reaction and the excess butyl alcohol are removed in the form of a constant boiling mixture. However, Bannister's technique has never been successfully applied to the formation of esters of boric acid and tertiary alcohols. As late as 1945, Scattergood, Miller and Gammon, Jr. have reported (J. A. C. S. 67: 2150-2 (1945)) the successful application of the Bannister method to the formation of borates from eighteen primary and secondary alcohols, however, they reported that the method was unsuccessful in the case of the three tertiary alcohols tried, viz., 2-methyl-propanol-2; 2-methylbutanol-2; and 3-methylpentanol-3. Thus, all attempts known to the inventor to esterify tertiary alcohols with boric acid or boric anhydride have failed. A more recent reference is L. H. Thomas (J. Chem. Soc. 1946, 820-4) in which he states that tertiary alkyl borates cannot be prepared directly from the alkyl tertiary alcohol and boric acid. Kahovec (Z. Phys. Chem. B43: 109–18 (1939)) did succeed in preparing tertiary butyl borate by reacting tertiary butyl alcohol with acetyl borate (the mixed anhydride of acetic and boric acids) but this is a method different from and more laborious than the direct esterification. Rippere et al. (J. Phys. Chem. 47; 204 (1943)) describe the preparation of a volatile borate by the action of isobutylene glycol on boric acid by heating equimolecular quantities of the glycol and acid. The product is acidic in nature. The process of the present invention yields the neutral borates.

The direct esterification of tertiary alcohols such as tertiary butyl alcohol, according to the literature, is not practical because of the slowness of the reaction and the tendency of the alcohol to dehydrate to the corresponding olefin under the usual esterification conditions. According to Hickinbottom "Reactions of Organic Compounds," page 81 (reprint of 1940—Longmans, Green and Co.): "In general, it may be said that primary alcohols react more readily than the corresponding secondary alcohols, while tertiary alcohols and phenols do not react to any serious extent. The preparation of acyl derivatives by the direct action of a carboxylic acid on an alcohol is restricted, therefore, for all practical purposes, to primary and secondary alcohols."

It is well known that boric acid acts toward alcohols very much like carboxylic acids, being easily esterified by primary and secondary alcohols in a direct esterification reaction. One would expect, in view of the above quotation, that it would not be possible to esterify tertiary butyl alcohol by the direct action of boric acid.

This invention is concerned with a new and efficient method for the direct esterification of tertiary alcohols, both monohydric and polyhydric, aliphatic, cyclic and aralkyl, with boric acid, metaboric acid or boric anhydride.

The invention is specifically concerned with a new and efficient method for the direct esterification of tertiary alcohols with boric acid by providing means whereby the water of the esterification reaction is efficiently removed.

Briefly, it has been found that if the esterification reaction is carried out in the presence of an entrainer, water-carrier or azeotrope-former in a reaction system provided with adequate fractionation apparatus, the water of reaction can be efficiently removed allowing the esterification reaction to proceed to the point where substantial yields of tertiary borates can be produced. Suitable water carriers which have been found to be particularly successful are aromatic hydrocarbons such as benzene, toluene, etc.; aliphatic hydrocarbons such as petroleum naphtha (boiling point 160–230° F.) etc.; halogenated hydrocarbons such as carbon tetrachloride, etc. In general, any inert carrier can be employed which forms a constant boiling mixture with water, or with water and the alcohol undergoing esterification, provided the boiling point of the constant boiling mixture is sufficiently removed from the boiling point of the tertiary alcohol to allow efficient separation therefrom. Any alcohol entering into the composition of the constant boiling mixture may be easily recovered and returned to the esterification reaction. Likewise, the entrainer or carrier may be separated by any of the known methods, recovered and returned to the reaction vessel. The temperature of the reaction mixture can be varied by increasing or decreasing the pressure on the system thus controlling the rate of reaction.

The esterification reaction is carried out by charging to a reaction vessel boric acid, the tertiary alcohol and the water-carrier such as benzene or naphtha etc. The mixture is then refluxed under an efficient fractionation column equipped with a head so arranged that water of reaction may be withdrawn while the carrier or entrainer is returned continuously to the top of the column.

The fractionation zone serves to effect the separation of the ternary azeotrope (tertiary alcohol-water-entrainer) from the less volatile constituent of the system, e. g. the tertiary alcohol. The fractionation zone may be an unpacked column of sufficient theoretical plates such as a bubble-cap tower or a packed tower. The packing may consist of any of the numerous inert materials known to the distillation art such as quartz, glass, porcelain, earthenware, tile, coke, crushed stone, etc. The refluxing is continued until the theoretical amount of water of reaction is removed. The water-carrier or entrainer is then removed by distillation. After the entrainer is distilled off, the product is collected by distillation under vacuum at about 1–100 mm. pressure, usually 1–10 mm. Any residue of high boron content may be returned to increase the yield of ester.

The time required for the removal of water of reaction varies with the alcohol being esterified, with the temperature of reaction and with the efficiency with which water is removed from the system and generally runs from 6 hours to 300 hours.

The drawing is a diagrammatical illustration of an apparatus adapted to carry out the process disclosed herein.

Referring to the drawing, numeral 1 represents a reaction vessel suitable for refluxing an esterification mixture. The reaction vessel is connected with a fractionation zone 2, preferably a packed fractionation tower. Vessel 1 is supplied with required amounts of tertiary alcohol, boric acid and entrainer and the vessel is then heated to refluxing temperature. As the esterification reaction proceeds the entrainer carries the water formed up the column 2 together with vapors of the tertiary alcohol undergoing esterification. The vapor mixture which succeeds in passing up the column is taken overhead via line 3, condensed in condenser 4 and led via line 5 to decanter 6. In the decanter the condensate is allowed to separate into two phases, an upper entrainer phase 7, and a lower aqueous phase 8. The upper entrainer phase is refluxed to the column 2 via line 9, while the aqueous phase is discarded from the system via line 10. When the esterification has proceeded to completion, the contents of the reaction vessel 1 are removed via line 11 to stripper 12. In the stripper unreacted alcohol and entrainer are removed overhead through line 13 and may be returned for use in further esterification. The borate is removed from the stripper via line 14 and may be recovered and purified from unreacted or partially esterified boric acid by known processes such as vacuum distillation etc. Any high boron content residue may be returned to the esterification vessel.

A number of experiments are reported below which show the need for using an entrainer to remove the water of esterification and a column for separating the azeotrope from the excess alcohol when tert.-butyl alcohol is being esterified with boric acid.

1. A flask was charged with 123.6 g. of boric acid, 666 g. of tert.-butyl alcohol and 500 ml. of benzene. It was attached to a packed (glass helices) column and refluxed, removing the aqueous layer while the oil layer was returned continuously to the top of the column. The volume of the aqueous layer at various stages of the reaction are noted below:

| Total Time | Total Volume of Aqueous Layer, cc. |
|---|---|
| 5 hrs. 40 min | 29 |
| 20 hrs. 35 min | 74 |
| 29 hrs. 40 min | 84 |
| 45 hrs. 15 min | 94 |
| 53 hrs. 40 min | 98 |
| 101 hrs. 40 min | 112 |

The product was worked up as will be described below.

2. In a second experiment the charge was 62 g. of boric acid, 333.5 g. of tert.-butyl alcohol and 300 ml. of benzene. The mixture was treated exactly as above except that the packed column was left out of the set-up. After 48 hours only about 1 ml. of aqueous layer had collected in the bottom of the trap indicating that a column is an essential part of the apparatus for the esterification of tert.-butyl alcohol.

3. In a third experiment, the charge was 62 g. of boric acid and 889 g. of tert.-butyl alcohol. The mixture was distilled using a packed column similar to that in the first experiment except that a regular distillation head was used. The mixture was distilled at a high reflux ratio eight hours a day for nine days. Each morning fresh tert.-butyl alcohol was added to replace that removed by distillation the preceding day. An attempt to isolate tert.-butyl borate from the reaction product failed. This indicates that an entrainer for the water is required in the esterification of tert.-butyl alcohol with boric acid.

4. Ethyl alcohol, benzene and water form an azeotrope that bears about the same relation to ethyl alcohol as the azeotrope, tert.-butyl alcohol, benzene, and water, bears to tert.-butyl alcohol. To determine if a column is essential in the esterification of ethyl alcohol with boric acid a flask was charged with 62 g. of boric acid, 350 cc. of absolute ethyl alcohol and 350 cc. of benzene. The flask was attached to the column and refluxed, removing the aqueous layer. The reaction was nearly complete in seven hours (95 ml. of aqueous layer) and definitely complete (120 ml.) in 24 hours. On the other hand, the reaction was much slower when the column was omitted from the set-up. Only 13 ml. of aqueous layer were obtained in seven hours, 48 ml. in 31 hours and 82 cc. in 192 hours. No more water would separate on prolonged refluxing. Since this was only about two-thirds as much aqueous layer as was obtained when the column was used, the flask was attached to the column and refluxing continued, whereupon the reaction went to completion readily, the remainder of the aqueous layer (38 ml.) being obtained in something less than fifteen hours.

These experiments indicate that a fractionating column is essential for the complete removal of water azeotropically with benzene, or similar solvent, when a third component which tends to form a ternary azeotrope with benzene and water and also tends to act as a mutual solvent for benzene and water, such as ethyl alcohol or tert.-butyl alcohol, is present. It appears that water may be removed by this method, without a column, until the concentration of water in the pot become so low that sufficient water does not appear in the distillate to cause separation into layers. With a column, however, the ternary azeotrope is efficiently separated from the other components so that even when the concentration of water in the pot becomes very low the distillate still separates into layers. This makes possible the complete removal of water.

In the reaction

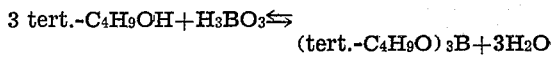

equilibrium under reaction conditions is such that only a small concentration of water is present in the pot and consequently water will not separate from the distillate unless a column is used. On the other hand, the reaction

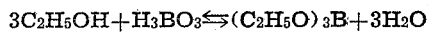

proceeds to the right sufficiently to give a concentration of water which permits separation even without a column. But the reaction cannot be carried to completion, for when about two-thirds complete the concentration of water is so low in the reaction mixture that the aqueous layer no longer separates from the distillate. A column is now required to carry the reaction to completion.

The process of the invention may be illustrated by the following examples, however, the invention is not to be considered as limited thereto.

EXAMPLE I

*Tertiary butyl borate*

Boric acid (123.6 g. 2 mols), tert.-butyl alcohol (667 g. 9 mols) and benzene (500 ml.) were charged into a flask under a packed column. The head of the column was so arranged that the distillate passed through a separator where the water of reaction could be drawn off while the benzene was returned continuously to the system. The reaction mixture was heated to maintain a steady reflux. During the 184 hours' reaction time, 111 ml. of aqueous layer was withdrawn from the separator. Theoretically, one should obtain 6 mols or 108 ml. of water from the reaction. There was no evidence of evolution of isobutylene during the reaction. The product was distilled at about 5 mm. pressure. The tert.-butyl borate (293 g.—64% yield) was collected at 60–64° C. It was a water-white liquid that could be distilled at atmospheric pressure without decomposition.

The product was redistilled using an efficient packed column at reduced pressure. Almost the entire product distilled at 50° C. at 9 mm. pressure. The pure product (a heart cut from the above distillation) had the following properties:

$n_{20/D}$ ------------------------------- 1.3879
$d_{20/4}$ -------------------------------- 0.8153
B. P. @ 760 mm _____°C__ 175

Analysis.—Found: 62.65% C; 11.80% H; 4.71% B. Calcd. for $C_{12}H_{27}O_3B$: 62.60% C; 11.82% H; 4.70% B.

In order to establish beyond a doubt that the product was tert.-butyl borate a portion of the product was hydrolyzed by shaking with an equivalent amount of water at room temperature. The boric acid was removed by filtration, and the alcohol was recovered by distillation. The boiling point, density, and index of refraction checked with the values given in the literature for tert.-butyl alcohol. Furthermore, the 3,5-dinitrobenzoate of the alcohol was prepared, and the melting point was found to check the value given in the literature for tert.-butyl 3,5-dinitrobenzoate. A mixed melting point with an authentic sample of the latter compound showed no depression.

EXAMPLE II

*Tertiary butyl borate*

A flask was charged with boric acid (123.6 g.), tert.-butyl alcohol (666 g.), and a petroleum naphtha, boiling point 160–230° F. (500 cc.). The flask was attached to an efficient fractionating column equipped with a head so arranged that water of reaction could be withdrawn while the naphtha was returned continuously to the top of the column. The mixture was refluxed for a total of 83 hours during which time a total of 117½ cc. of water were withdrawn. This is slightly more than the theoretical amount of water. Naphtha was now removed from the top of the column until the pot temperature reached 100° C. Distillation was continued at reduced pressure, using a short Vigreux type column. The tert-butyl borate (346 g., 75% yield) was collected at 45–53° C. at 4–5 mm. pressure. The residue (42.5 g.), of high boron content, may be recycled to increase the yield of ester.

A similar run was made using carbon tetrachloride as the water carrier with similar results.

EXAMPLE III

In a similar way, boric acid was esterified with tert.-amyl alcohol. The charge was boric acid (93 g.), tert.-amyl alcohol (610 cc.), and benzene (500 cc.). The reaction period was 32 hours. The tert.-amyl borate (160 g. 40% yield) was collected at 63–67° C. at 2–3 mm. pressure. The residue 96.5 g. was high in boron content and may be recycled to increase the yield.

The main fraction was analyzed.

Analysis.—Found: 65.34% C; 12.25% H; 4.19% B. Calcd. for $C_{15}H_{33}O_3B$: 66.17% C; 12.22% H; 3.97% B.

EXAMPLE IV

*Tertiary amyl borate*

A flask was charged with pure tert.-amyl alcohol (1800 g., 20 mols), boric acid (309 g., 5 mols) and benzene (1000 ml.). The mixture was refluxed using an efficient column equipped with a head that permitted withdrawal of the aqueous layer while the oil layer was returned continuously to the system. After twelve days of continuous operation the amount of water (265 ml.) approached the theoretical (270 ml.). The benzene was stripped from the reaction mixture and the excess tert.-amyl alcohol was recovered by distillation at about 100 mm. pressure. The product was distilled at 2–3 mm. pressure. The main fraction (1000 g., 3.68 mols, 74% of theory) was collected at 70–80° C. This was fractionated at 1 mm. pressure using an efficient fractionating column. Practically the entire product distilled at 55–56° C. The pure tert.-amyl borate, a heart cut from the preceding fractionation, had the following properties:

$n_{20/D}$ ------------------------------- 1.4124
$d_{20/14}$ ------------------------------- 0.8482
B. P. @ 760 mm. _____°C___ 235

Analysis.—Found: 66.08% C; 12.40% H; 4.00%

B. Calcd. for $C_{15}H_{33}O_3B$: 66.17% C; 12.22% H; 3.97% B.

EXAMPLE V

*Tertiary hexyl borate (from dimethyl-n-propylcarbinol)*

In exactly the same way, boric acid was esterified with dimethyl-n-propylcarbinol. The charge was dimethyl-n-propylcarbinol (86.5 g.), boric acid (15.5 g.), and benzene (250 cc.). The product (65 g., 83% yield) was collected at 74° to 95° C. at 1-2 mm. pressure.

*Analysis.*—Found: 68.56% C; 12.81% H; 3.40% B. Calcd. for $C_{18}H_{39}O_3B$: 68.81% C; 12.51% H; 3.44% B.

EXAMPLE VI

*Terpinyl borate*

Terpinyl borate was prepared by refluxing a mixture of alpha-terpineol (292 g.), boric acid (36.2 g.) and benzene (350 cc.) removing the water of reaction. The theoretical amount of water (30 cc.) was obtained during the reaction period of 72 hours. The product was obtained by concentration in a flask at 80° under 1-2 mm. pressure. The residue of terpinyl borate (277.5 g. 100% yield) was a viscous liquid, light yellow in color.

*Analysis.*—Found: 75.17% C; 11.19% H; 1.72% B. Calcd. for $C_{30}H_{51}O_3B$: 76.58% C; 10.92% H; 2.30% B.

EXAMPLE VII

*Linalyl borate*

Linalool (100 g.), boric acid (12 g.), and benzene (200 cc.) were refluxed removing water of reaction. The benzene was removed by distillation at reduced pressure, and the residue concentrated by heating to 80° C. at 1-2 mm. pressure. The resulting product (90 g., 96% yield) was a light yellow liquid.

*Analysis.*—Found: 73.35% C; 10.91% H; 2.41% B. Calcd. for $C_{30}H_{51}O_3B$: 76.58% C; 10.92% H; 2.30% B.

EXAMPLE VIII

Pinacol borate was prepared in a similar way. The charge was pinacol (100 g.), boric acid (34.5 g.), and benzene (400 cc.). The refluxing period was 30 hours during which time 28½ cc. of water were obtained. Benzene was removed by distillation at reduced pressure. The residue was then heated to 100° C. at 1-2 mm. pressure. The resulting product, which remained in the distillation flask (100 g., 96% yield), was a white crystalline solid melting at 193-196° C. It is the borate of pinacol, $C_{18}H_{36}O_6B_2$.

*Analysis.*—Found: 58.72% C; 9.92% H; 5.70% B. Calcd. for $C_{18}H_{36}O_6B_2$: 58.43% C; 9.81% H; 5.85% B.

EXAMPLE IX

*3-methyl-1,3-butanediol borate*

A mixture of 3-methyl-1,3-butanediol (58 g.), boric acid (23 g.), and benzene (200 cc.) was refluxed for 10 hours removing the water of reaction (10 cc.). The resulting mixture was filtered, and the filtrate concentrated by distillation at reduced pressure. The residue was finally heated to 80° C. at 1-2 mm. pressure, leaving a very pale yellow liquid (59 g., 97% yield) the borate of 3-methyl-1,3-butanediol.

*Analysis.*—Found: 51.59% C; 8.44% H; 5.84% B. Calcd. for $C_{15}H_{30}O_6B_2$: 54.91% C; 9.22% H; 6.60% B.

EXAMPLE X

*2,3-dimethyl-1,3-butanediol borate*

A mixture of boric acid (61.84 g.), 2,3-dimethyl-1,3-butanediol (177 g.), and benzene (500 cc.) was mixed and refluxed removing the water of esterification from the system. During the reaction period of 24 hours about 90% of the expected quantity of water was obtained. The benzene was removed by distillation at reduced pressure, and the residue concentrated by heating to 80° C. at 1-2 mm. pressure. The product (188 g., 100% yield) was a pale yellow fairly viscous liquid.

*Analysis.*—Found: 54.74% C; 9.37% H; 6.18% B. Calcd. for $C_{18}H_{36}O_6B_2$: 58.43% C; 9.71% H; 5.85% B.

EXAMPLE XI

*2-methyl-2,4-pentanediol borate*

The charge consisted of boric acid (61.84 g.), 2-methyl-2,4-pentanediol (177 g.), and benzene (500 cc.). The mixture was refluxed removing the water of esterification continuously as it formed. During the reaction period of 20 hours, the theoretical quantity of water was obtained. Benzene was removed by distillation at reduced pressure, and the product finally concentrated by heating to 80° C. at 1-2 mm. pressure. The product (185 g., 100% yield) was a water white, fairly viscous liquid.

*Analysis.*—Found: 57.80% C; 9.94% H; 6.12% B. Calcd. for $C_{18}H_{36}O_6B_2$: 58.43% C; 9.71% H; 5.85% B.

EXAMPLE XII

*2 - methyl - 1,2 - propanediol borate (isobutylene glycol borate)*

2-methyl-1,2-propanediol (54 g.), boric acid (20 g.) and benzene (100 cc.) were mixed and refluxed for 24 hours removing the water of reaction. The borate of the glycol was obtained as a residue by heating the reaction mixture to 100° C. at 1 mm. pressure. The residue was slightly cloudy due to the slight excess of boric acid. After filtration, it was a clear yellow slightly viscous liquid. The yield was 63 g. or 87% of the theory.

*Analysis.*—Found: 52.06% C; 8.62% H; 7.41% B. Calcd. for $C_{12}H_{24}O_6B_2$: 50.40% C; 8.46% H; 7.57% B.

EXAMPLE XIII

*Esterification of terpin hydrate with boric acid*

Terpin hydrate (100 g.), boric acid (18.5 g.), and benzene (400 cc.) were mixed in a flask and refluxed for twelve hours during which time the water obtained (25 cc.) was only slightly less than that expected from the removal of the water of crystallization and esterification. The benzene was removed by distillation at reduced pressure, and the residue concentrated by heating to 100° C. at 1-2 mm. pressure. The product (99 g., 125% yield) was a very viscous colorless syrup that solidified to a brittle glass when cooled. The greater than theoretical yield is due to the excess terpin hydrate that was used.

*Analysis.*—Found: 64.96% C; 10.83% H; 2.55% B. Calcd. for $C_{30}H_{54}O_3B$: 67.69% C; 10.22% H; 4.06% B.

EXAMPLE XIV

Dimethylphenylcarbinyl borate

A flask was charged with dimethylphenylcarbinol (41 g.), boric acid (3 g.) and benzene (150 cc.). The water of reaction was removed as in preceding examples. This required about 24 hours. The product was concentrated by heating to 100° C. at 1 mm. pressure. The residue (20 g., 95% yield) solidified at room temperature. It melted at 42° C.

*Analysis.*—Found: 77.11% C; 8.53% H; 2.44% B. Calcd. for $C_{27}H_{33}O_3B$: 77.88% C; 7.99% H; 2.60% B.

In the method outlined in the above examples, boric acid has been used. It is to be understood, however, that in the preparation of the borates, boric anhydride or metaboric acid may be regarded as the equivalent of boric acid, and the term boric acid is used in the specification and claims with this understanding.

The borates of tertiary alcohols containing more than four carbon atoms produced by the process described are new compositions of matter. These borates are valuable intermediates for chemical reaction and can be employed to introduce the particular group into various other chemical compounds, e. g. the tert.-amyl borate may be employed to react with aniline yielding tert.-amyl aniline. The borates may also be employed for producing ethers and other related compounds. They may be used to alkylate aromatic hydrocarbons. On heating in the presence of mineral acids the borates of tertiary alcohols yield olefins and diolefins. They may be used for the dehydration of solutions where anhydrous tertiary alcohols are the desired solvents. They also enter into ester interchange reactions.

Having thus fully described the invention and having adequately simplified the invention so that it may be practiced by those skilled in the art without further experimentation,

I claim:

1. A process for producing tertiary butyl borate which comprises reacting tertiary butanol with boric acid in a reaction zone having present therein a volatile water-immiscible entrainer, heating the reaction zone to the boiling point of the mixture, passing a vapor mixture comprising the ternary azeotrope of tertiary butanol, water and the entrainer together with excess tertiary butanol from the reaction zone to a fractionation zone wherein the excess tertiary butanol is separated from the ternary azeotrope, refluxing the excess tertiary butanol to the reaction zone, condensing the azeotrope vapor from the fractionation zone whereby an aqueous phase and a water-immiscible entrainer phase are formed, removing the aqueous phase, returning the entrainer phase to the reaction zone, and recovering tertiary butyl borate from a residual mixture in the reaction zone.

2. A process according to claim 1 in which the entrainer is benzene.

3. A process according to claim 1 in which the entrainer is petroleum naphtha boiling in the range of 160° F. to 230° F.

4. A process according to claim 1 in which the entrainer is carbon tetrachloride.

5. In a process for producing tertiary butyl borate which comprises reacting tertiary butanol with boric acid in the presence of an entrainer, heating the reaction mixture to its boiling point, passing into a fractionation zone a vapor mixture comprising tertiary butanol, water, entrainer and azeotropes of these components, removing the ternary azeotrope of tertiary butanol, water and entrainer from the fractionation zone under fractionation conditions that will separate the ternary azeotrope from the other components, and recovering tertiary butyl borate from the residual mixture in the reaction zone.

6. A process for producing tertiary butyl borate which comprises reacting tertiary butanol with boric acid in a reaction zone having present therein an entrainer, heating the reaction mixture to its boiling point, passing a vapor mixture comprising the ternary azeotrope of tertiary butanol, water, and the entrainer together with excess tertiary butanol from the reaction zone to a fractionation zone, separating in the fractionation zone the excess tertiary butanol from the ternary azeotrope, refluxing the excess tertiary butanol to the reaction zone, and recovering tertiary butyl borate from the residual mixture in the reaction zone.

7. A process for producing tertiary butyl borate which comprises reacting tertiary butanol with boric acid in the presence of an entrainer, heating the reaction mixture to its boiling point, passing into a fractionation zone a vapor mixture comprising tertiary butanol, water, entrainer, and azeotropes of these components, condensing the components other than the ternary mixture of tertiary butanol, water, and entrainer in the fractionation zone, returning the condensed components to the reaction mixture in the reaction zone, and recovering tertiary butyl borate from the residual mixture in the reaction zone.

8. A process for producing tertiary butyl borate which comprises reacting tertiary butanol with boric acid in the presence of an entrainer, heating the reaction mixture to its boiling point, passing into a fractionation zone a vapor mixture comprising tertiary butanol, water, entrainer and azeotropes of these components, removing the ternary azeotrope of tertiary butanol, water, and entrainer from the fractionation zone, and recovering tertiary butyl borate from the residual mixture in the reaction zone.

SAMUEL B. LIPPINCOTT.

References Cited in the file of this patent

UNITED STATES PATENTS

| Number | Name | Date |
|---|---|---|
| 1,668,797 | Bannister | May 8, 1928 |
| 1,733,440 | Zeitschel | Oct. 29, 1929 |
| 1,886,885 | Kaufmann | Nov. 8, 1932 |
| 2,260,338 | Prescott et al. | Oct. 28, 1941 |

FOREIGN PATENTS

| Number | Country | Date |
|---|---|---|
| 448,419 | Germany | Aug. 18, 1927 |

OTHER REFERENCES

Scattergood et al.: "Jour. Amer. Chem. Soc.," vol. 67 (1945), pages 2150–2152.

Thomas: "Jour. Chem. Soc. (London)," vol. 1946, pages 820–822.